(No Model.)
J. E. KECK.
BASE FOR CHEESE COVERS.
No. 320,141. Patented June 16, 1885.
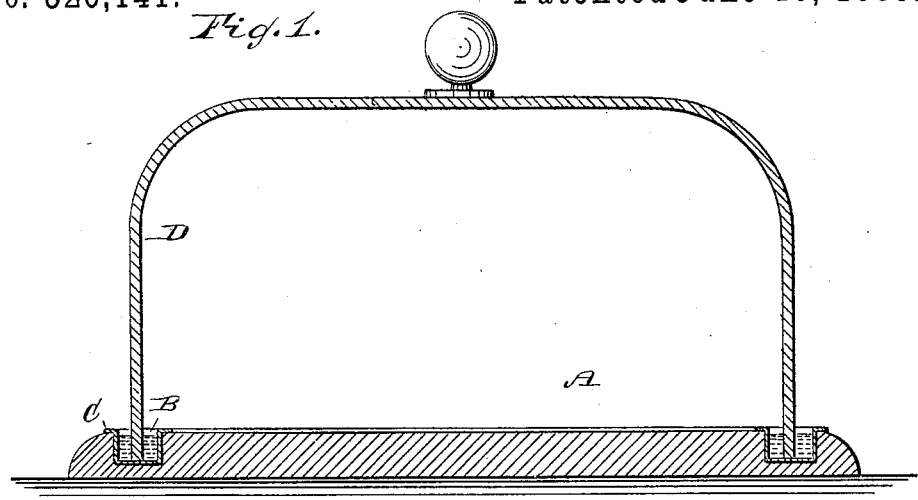
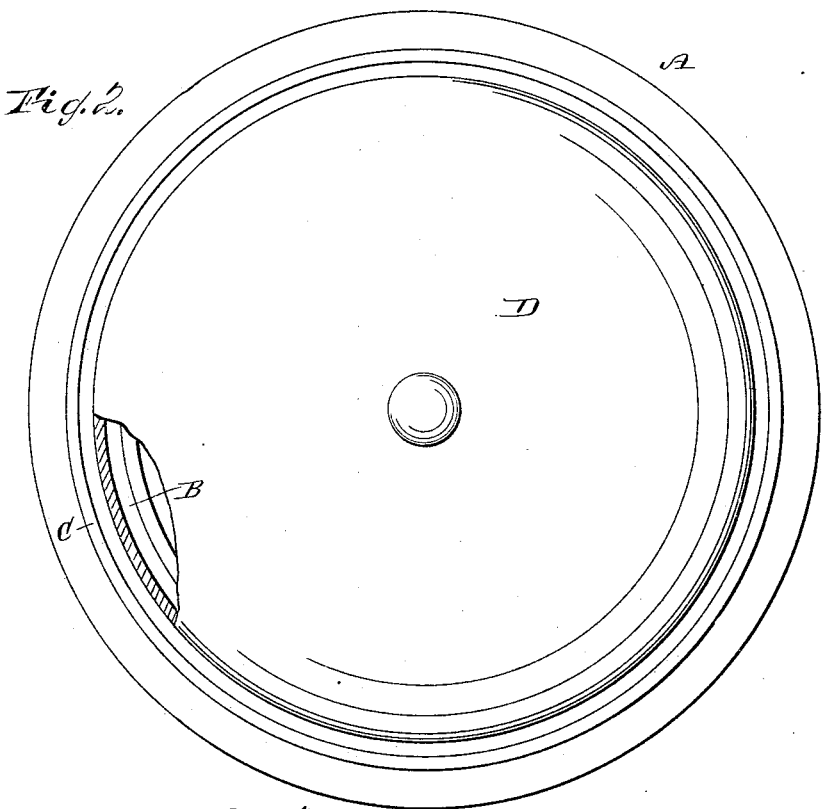
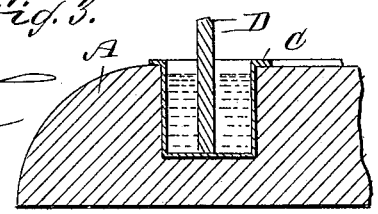
WITNESSES:
INVENTOR:
J. E. Keck
BY Munn & Co.
ATTORNEYS.

UNITED STATES PATENT OFFICE.

JOHN E. KECK, OF NEW YORK, N. Y.

BASE FOR CHEESE-COVERS.

SPECIFICATION forming part of Letters Patent No. 320,141, dated June 16, 1885.

Application filed March 10, 1885. (No model.)

*To all whom it may concern:*

Be it known that I, JOHN E. KECK, of the city, county, and State of New York, have invented a new and Improved Base for Cheese-Globes, of which the following is a full, clear, and exact description.

The object of my invention is to provide a new and improved base for cheese-globes, which base is provided with a water-seal, thus preventing the cheese on the base and under globe from drying out.

The invention consists in the peculiar construction and arrangement of parts, as hereinafter fully described, and pointed out in the claim.

Reference is to be had to the accompanying drawings, forming part of this specification, in which similar letters of reference indicate corresponding parts in all the figures.

Figure 1 is a cross-sectional view of a cheese-globe on my improved base. Fig. 2 is a plan view of the same, parts being broken out. Fig. 3 is a detail sectional elevation of part of the base.

The circular base A, preferably made of wood, is provided in its top surface with an annular groove, B, or trough along its rim, which groove is provided with a metal lining, C. The glass globe D, which is of such diameter that its bottom edge fits in the said groove B, is used to cover the cheese, &c., placed on the base A. A quantity of salt-water is poured into the groove B, the bottom edge of the globe dipping into the salt-water, which forms a water-seal, and thus prevents air passing into the globe or the air in the globe passing out. The moisture in the cheese cannot evaporate, and the cheese remains fresh and good, even if kept under the globe for a considerable length of time.

I prefer to make the base A of wood; but it can be made of metal, glass, or porcelain.

I am aware that a vessel has been provided with an annular grooved projection for containing water, upon the bottom of which groove the flange of the cover rests, and I therefore do not claim such invention.

Having thus described my invention, I claim as new and desire to secure by Letters Patent—

The combination, with the base A, having an annular groove in its top, of the lining C in the said groove, substantially as herein shown and described.

JOHN E. KECK.

Witnesses:
OSCAR F. GUNZ,
C. SEDGWICK.